(12) United States Patent
Shearer

(10) Patent No.: US 7,356,648 B2
(45) Date of Patent: Apr. 8, 2008

(54) SHARED BUFFER HAVING HARDWARE CONTROLLED BUFFER REGIONS

(75) Inventor: Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/677,425

(22) Filed: Oct. 2, 2003

(65) Prior Publication Data
US 2005/0076166 A1    Apr. 7, 2005

(51) Int. Cl.
G06F 12/00 (2006.01)
(52) U.S. Cl. .................................. 711/129
(58) Field of Classification Search ............... None
See application file for complete search history.

(56) References Cited
U.S. PATENT DOCUMENTS 5,862,409 A * 1/1999 Yoshimoto et al. ........... 710/57
5,889,792 A    3/1999 Pajuvirta et al.
6,044,418 A * 3/2000 Muller ........................ 710/56
6,230,220 B1 * 5/2001 Cohen et al. ................. 710/52
6,735,633 B1 * 5/2004 Welch et al. ............... 709/233
2002/0085493 A1 7/2002 Pekkala et al.
2004/0047367 A1 * 3/2004 Mammen .................... 370/472
2004/0064664 A1 * 4/2004 Gil ............................. 711/170
2004/0078532 A1 * 4/2004 Tremaine .................... 711/160

FOREIGN PATENT DOCUMENTS
CN    1136376 A    11/1996
WO    9515636 A1    6/1995

* cited by examiner

Primary Examiner—Hyung S Sough
Assistant Examiner—Craig E Walter
(74) Attorney, Agent, or Firm—Patterson & Sheridan LLP

(57) ABSTRACT

Buffer memories having hardware controlled buffer space regions in which the hardware controls the dimensions of the various buffer space regions to meet the demands of a particular system. The hardware monitors the usage of the buffer data regions over time and subsequently and automatically adjusts the dimensions of the buffer space regions based on the utilization of those buffer regions.

19 Claims, 3 Drawing Sheets

SHARED BUFFER HAVING HARDWARE CONTROLLED BUFFER REGIONS

BACKGROUND OF THE INVENTION

1. Field of the Invention

Embodiments of the present invention generally relate to buffer memories. More particularly, this invention relates to shared buffer memories having hardware-based self-adjustment of the buffer regions.

2. Description of the Related Art

Transmitting data between processors and input/output devices has usually been performed by sending data in parallel according to a predetermined specification, e.g., the PCI (Peripheral Component Interconnect) bus architecture. However, because of market demands for increased data transmission rates the speed limitations of parallel data transmission have become apparent. Because of such limitations the use of serial data transmissions, e.g. the InfiniBand architecture, has begun replacing parallel data transmission architectures in applications such as high-end servers.

Conceptually, serial data transmissions send data serially, bit by bit. However, high performance serial data transmission architectures, e.g. InfiniBand, typically use multiple data virtual lanes (channels) that enable fast data transmission rates. InfiniBand virtual lanes are formed by connecting host channel adapters (HCAs), which are I/O engines within a server, and target channel adapters (TCAs), which are external I/O engines, together through InfiniBand switches. Each HCA and TCA can support up to 16 virtual lanes (VLs). The InfiniBand interconnection scheme is called a fabric. Because of its speed and multiple VLs the InfiniBand architecture can support tens of thousands of nodes in a single subnet at transmission rates of 2.5 GBps and beyond on copper wire (up to 17 meters) and on fiber optic cables (up to 10 km).

The InfiniBand specification requires sufficient buffer space for each virtual lane to store a full maximum transfer unit (MTU), with an MTU being the maximum data packet size in the InfiniBand fabric. However, that buffer space requirement represents a minimum and additional buffer space can improve system performance. Thus, large buffer spaces are beneficial.

Because large memories have performance and cost advantages over numerous smaller memories it is highly advantageous to use a reduced number, ideally one, of buffer memory devices in an InfiniBand channel adaptor (either HCA or TCA). Thus, a large, shared buffer memory dimensioned to have at least the minimum required buffer space for each virtual lane is beneficial. To improve performance, additional buffer space for the virtual lanes is desirable. Simply adding additional memory for each VL can radically increase the size and cost of the shared buffer memory. Since some virtual lanes seldom can make use of more than their minimum required buffer space, allocating such virtual lanes more buffer space is a waste. Yet other virtual lanes can dramatically benefit from increased buffer space. Therefore a method of dynamically increasing the sizes of the buffer spaces for the virtual lanes that can benefit from an increased buffer space would be useful.

Shared buffer memories are well-known. Software control of buffer space dimensions has benefited numerous applications. Unfortunately, it is difficult to design and to implement software configured buffer spaces that accommodate different and varying traffic loads as can occur in the InfiniBand fabric. Very often, even if software-configured buffer spaces are available those buffer spacers are either not configured or are poorly configured because the controlling software does not understand the nature of the system, its particular applications, and changes in buffer space demands sufficiently well to allocate appropriate buffer space sizes. This can cause performance degradation when a large part of the buffer memory is unused.

Compounding the problem of software controlling buffer space dimensions is that the same buffer memory chip can be used in very different ways in very different applications. In view of the economic and performance demands of large buffer memories and the limitations of software controlled buffer spaces, a buffer memory having hardware controlled buffer space dimensions and in which the hardware adjusts the buffer space dimensions to meet the demands of a particular system would be useful.

SUMMARY OF THE INVENTION

The present invention provides for shared buffer memories having hardware controlled buffer space regions in which the hardware controls the dimensions of the buffer space regions according to the demands of a particular application. The hardware monitors the usage of the various buffer regions over a period of time, and subsequently and automatically adjusts the dimensions of the various buffer regions based on the utilizations of the individual buffer regions.

In accord with the present invention, a barrier within a large buffer memory that is shared by at least two different data classes is assigned by hardware. A data class is data that is associated with only one network. The barrier divides the buffer memory into two portions, one for each of the data classes. Each data class can be stored in its own portion of the data buffer memory space. The hardware monitors the usage of the two portions to determine which data class uses its portion more in a time period. If one data class uses its portion more than the other, the hardware dynamically re-adjusts the barrier to provide the more needy data class with a larger portion and the less needy data class a smaller portion. One way to determine which data class uses its portion more is to count the number of times in a given period that each portion is filled.

Alternatively, a large buffer memory can be shared by multiple data classes, such an InfiniBand virtual lane. Each data class is assigned a region of the buffer memory for its use. Hardware monitors the various regions to determine how often the individual regions are fully utilized in a given time period. If one of the regions is utilized more than other regions, the hardware dynamically adjusts the region barriers such that the data class that fills it region most often is allocated a larger region, with the additional memory being taken from a data class that less often fully utilizes its region.

In some applications each data class is reserved a minimum size. In that case, the data class that fills its region most often is allocated a larger region, with the additional region being taken from a data class that less often fully utilizes its region, but one that is larger than the reserved minimum size.

In the specific case of the InfiniBand architecture, if one data class that is associated with a particular VL requires a larger buffer region that VL's region is dynamically adjusted by hardware to meet the needs of the particular VL. The data buffer usage of all of the VLs is monitored by a central unit that counts the total full conditions of each buffer region within a configurable time period. At the end of the time period the counts are compared, and the VL buffer regions are adjusted such that a larger buffer region is made available to the most frequently used VL buffer region by reducing the dimensions of a buffer region associated with the least frequently used VL buffer region. The counts are then cleared and the counting process begins again. Once a VL's buffer region has been reduced to a predetermined minimum size the dimensions of that buffer region is no longer reduced, but the next least busy buffer region is re-dimensioned to have a smaller buffer region.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention provides for buffer memory, and for their applications, having hardware controlled buffer regions in which the hardware controls the dimensions of the buffer regions to meet the demands of the particular system. The hardware monitors the usage of the buffer regions over a period of time, and then automatically adjusts the dimensions of the buffer regions based on the utilization of the buffer regions. The present invention is particularly well-suited to applications with fairly constant, well-defined data traffic patterns. In such situations the data buffer space could remain very highly utilized with very little buffer management overhead.

Figure 1:
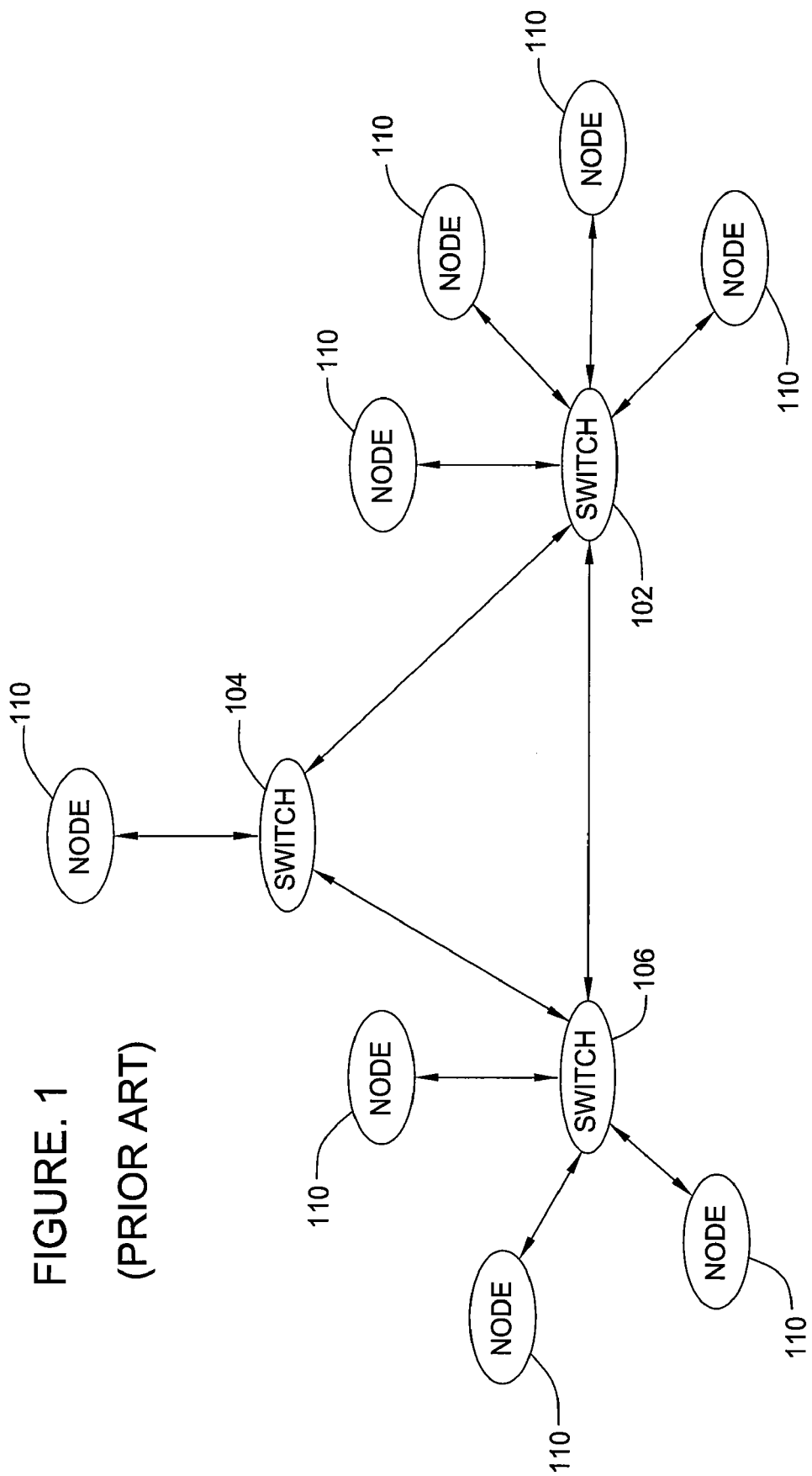
FIG. 1 illustrates an InfiniBand fabric.

FIG. 1 illustrates a generic InfiniBand fabric. A plurality of switch networks 102, 104, and 106 are serially interconnected by a network of copper wires or optical fibers. In some applications the switch networks may be operatively connected to network links that might, for example, connect to the internet. The interconnections and switch networks pass packets of information to and/or from one or more nodes 110, which may be CPUs, network links, printers, and/or another type of I/O device.

Figure 2:
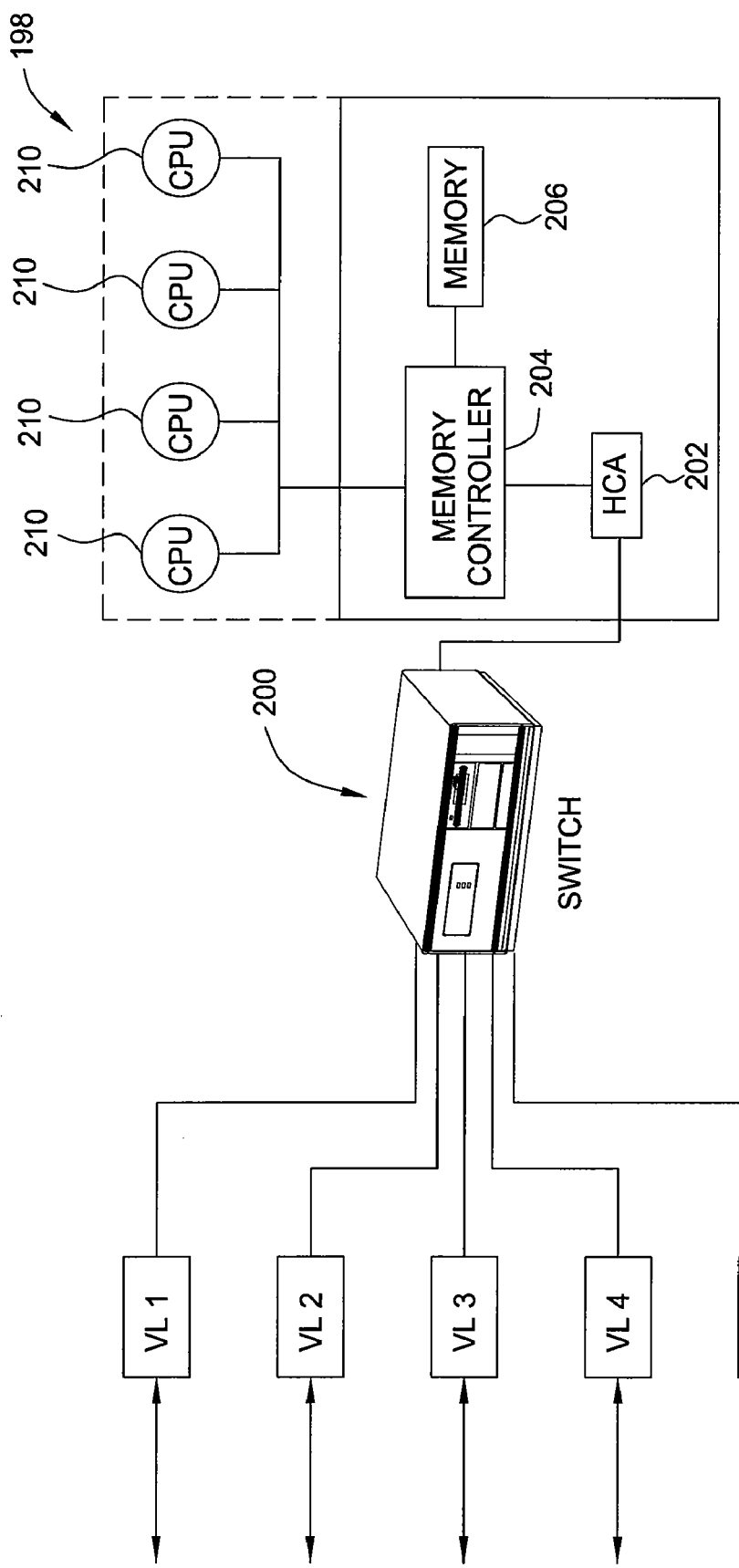
FIG. 2 illustrates InfiniBand connections between a Host Channel adaptor and associated host devices, and further illustrates a plurality of virtual lanes.

FIG. 2 illustrates a generic switch network 198 that is illustrated as being divided into a switch 200, a host card adaptor(HCA) 202, a memory controller 204, and a buffer memory 206. The buffer memory 206 is comprised of a plurality of memory registers that are organized and addressable by addresses. FIG. 2 also shows a number of nodes 210, shown as CPUs that interact with the switch network 198. The nodes 210 are not part of the switch network 198, but are shown to assist the understanding of the operation of the switch network 198. FIG. 2 also illustrates a plurality of virtual lanes, VL1-VLN, which are not physical entities, but conceptually represent data classes and channels, each of which is associated with a buffer region in the buffer memory 206. The virtual lane data is switched into and out of the host card adaptor 202. The generic switch network 198 is serially connected to the external environment.

Figure 3:
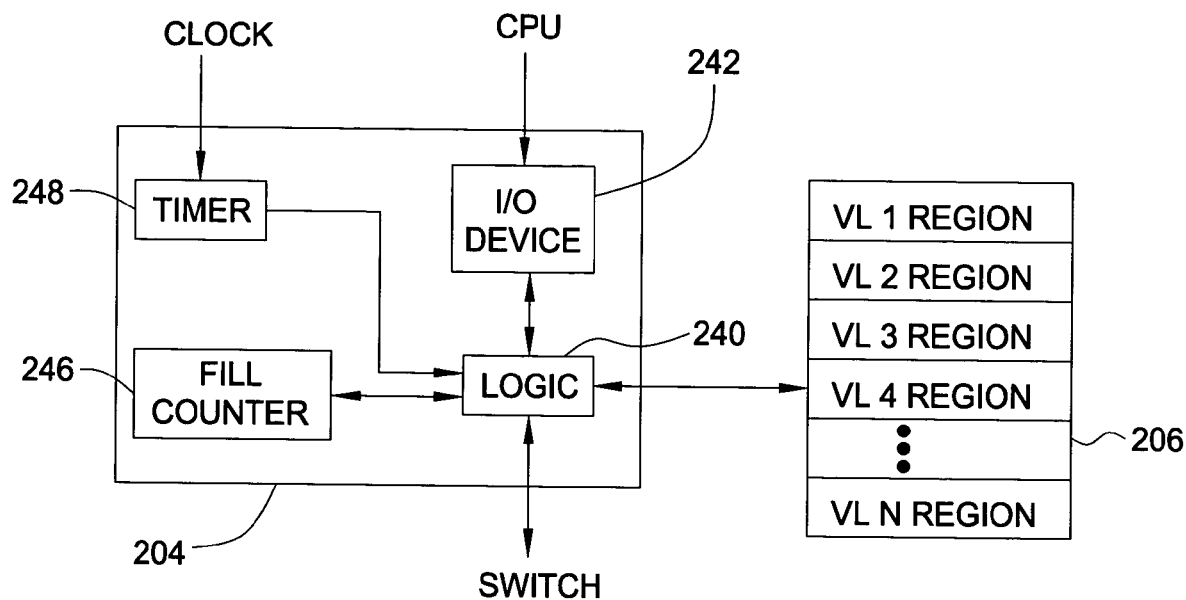
FIG. 3 illustrates a memory controller and a large buffer memory that is divided into a plurality of buffer regions, one for each virtual lane at start-up.

FIG. 3 illustrates the memory controller 204 and the buffer memory 206 in more detail. While FIG. 3 shows two discrete devices, in practice the memory controller 204 and the buffer memory 206 are beneficially fabricated together in a single chip device. The memory controller 204 is implemented in hardware (which should be understood to include firmware executing in the hardware).

The memory controller 204 includes a logic network 240 that WRITEs and READs data into and out of the buffer memory 206. The logic network 240 also passes data to and from an I/O driver 242 that interfaces to the nodes 210 (see FIG. 2), and to and from the host connector adaptor 202 (see FIG. 2). The logic network 240 connects to a fill counter 246 and to a timer 248. The fill counter 246 and the timer 248 are discussed subsequently.

The buffer memory 206 is conceptually partioned into a plurality of virtual lane buffer regions, illustrated as VL1 regions through VLN region. The virtual lane buffer regions act as short-term memory for the virtual lanes. Thus, when data is to be sent on virtual lane VL1, the VL1 region stores that data until the host connector adaptor HCA 202 can process that data. Likewise, when data is being received on VL1, the VL1 region stores the received data until the nodes 210 can accept the data. When a virtual lane buffer region becomes full, that is when it cannot handle more information, the memory controller 204 initiates a system delay to enable the HCA 202 or the nodes 210 to accept data from the full virtual lane region. Thus, filling a virtual lane buffer region causes a system delay.

Still referring to FIG. 3, each time that a virtual lane buffer region becomes full the logic 240 increments a register within the fill counter 246 that is associated with the full virtual lane. Thus, the fill counter 246 tracks how many delays are caused by each virtual lane buffer region. While the foregoing has described incrementing a register when a virtual lane buffer region becomes full, in practice other conditions could be used. For example, a register could be incremented with a particular level, e.g. 80% full, is reached or on every WRITE and/or READ from a virtual lane region. What is important is that some indicia of virtual lane buffer region usage is used so that the dimensions of the virtual lane buffer regions can be adjusted to improve system operation.

Figure 4:
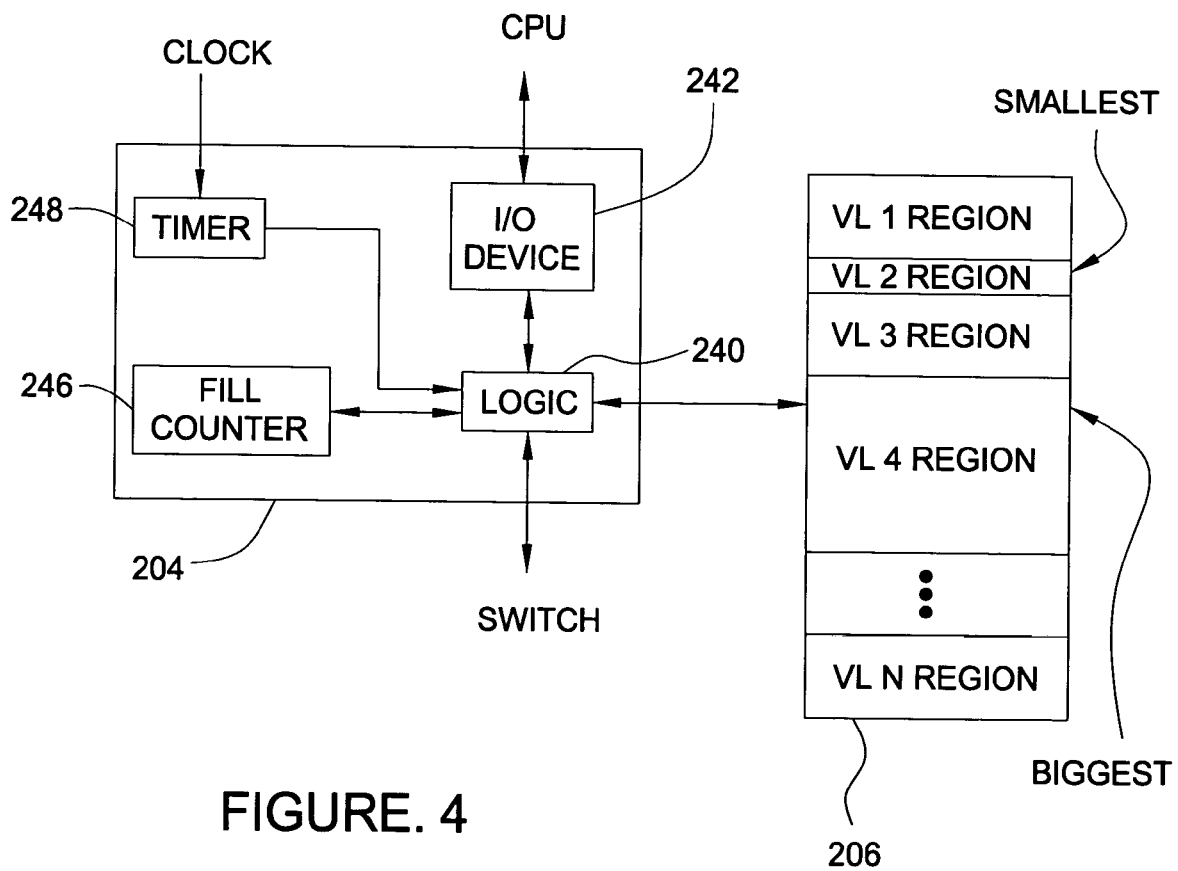
FIG. 4 illustrate the memory controller and the buffer memory after reconfiguration.

After a predetermined period of time the timer 248 signals the logic 240. In response, the logic 240 interrogates the fill counter 246 to determine how many times each virtual lane buffer region filled (or reached some other indicia of usage) in the predetermined time period. If one (or more) virtual lane buffer region was more fully used than other virtual lane buffer regions the logic 240 re-allocates the virtual lane buffer region dimensions (partitions) such that the more fully used virtual lane buffer region is assigned more of the buffer memory 206 and such that another virtual lane buffer region, which is less fully utilized, is allocated a smaller portion of the buffer memory 206. This is illustrated in FIG. 4, which represents the buffer memory 206 after re-allocations. As shown, virtual lane buffer region 2 and 3 now have less of the buffer memory 206 while virtual lane buffer region 4 has much more of the buffer memory 206.

The dimensions of the virtual lane buffer regions can be controlled by the logic 240. No physical partitioning is required because the logic 240 initiates all READs and WRITEs, and can thus allocate all areas of the buffer memory 206.

Because the memory controller 204 is used in an InfiniBand system, and because the InfiniBand architecture requires a minimum sized buffer memory for each virtual lane, the memory controller is configured such that no virtual lane buffer region is ever reduced below the minimum requirement.

While FIGS. 1-4 directly relate to the InfiniBand architecture, in practice the present invention will find use in other systems in which different data classes exist.

While the foregoing is directed to embodiments of the present invention, other and further embodiments of the invention may be devised without departing from the basic scope thereof, and the scope thereof is determined by the claims that follow.

The invention claimed is:

1. A memory device, comprising:
   a buffer memory having a plurality of addressable memory registers; the buffer memory capable of being partitioned into a plurality of buffer regions;
   a counter having a plurality of storage registers, each storage register being associated with a respective buffer region of the buffer memory;
   a logic network for writing and reading data into and out of the buffer memory, the logic network for partitioning the buffer memory into the plurality of buffer regions, wherein the logic network writes/reads data from a plurality of unique data classes into/from the plurality of buffer regions such that each data class is uniquely written into and uniquely read from a different buffer region, and wherein the logic network increments a value in a respective storage register associated with a respective buffer region each time that buffer region reaches a predetermined usage level; and
   a timer for periodically sending a timing signal to the logic network, the period of the timing signal defining a timing window;
   wherein in response to the timing signal, the logic network:
      recalls the respective values from the storage registers;
      whereby the respective value stored in each storage register indicates a number of times that the respective buffer region reaches the predetermined usage level within the timing window; and
      re-partitions the buffer memory according to the respective value having a highest value such that a more utilized buffer region is assigned more of the addressable memory registers.

2. A memory device according to claim 1 wherein the logic network assigns a buffer region that is used less often fewer addressable memory registers.

3. A memory device according to claim 1 wherein each buffer region is always assigned at least a minimum number of addressable memory registers.

4. A memory device according to claim 1 wherein the predetermined usage level is full.

5. A memory device according to claim 1 wherein when a least used buffer region is assigned a minimum number of addressable memory registers the logic network assigns a buffer region that is less often fully utilized but that has more than the minimum number of addressable memory registers.

6. A memory device according to claim 1 wherein the data classes represent virtual lanes.

7. A memory device according to claim 1 wherein the timing signal initiates clearing of the plurality of storage registers.

8. A switch network comprising:
   a network switch;
   a card adaptor for transmitting and receiving data from the network switch, and
   a memory device for storing data for and from the card adaptor, the memory having:
      a buffer memory having a plurality of addressable memory register; the buffer memory capable of being partitioned into a plurality of buffer regions;
      a counter having a plurality of storage registers, each storage register being associated with a respective buffer region of the buffer memory;
      a logic network for writing and reading data into and out of the buffer memory, the logic network for partitioning the buffer memory into the plurality of buffer regions, wherein the logic network writes/reads data from a plurality of unique data classes into/from the plurality of buffer regions such that each data class is uniquely written into and uniquely read from a different buffer region, and wherein the logic network increments a value in a respective storage register associated with a respective buffer region each time that buffer region reaches a predetermined usage level; and
      a timer for periodically sending a timing signal to the logic network, the period of the timing signal defining a timing window;
      wherein in response to the timing signal the logic network:
         recalls the respective values from the storage registers, whereby the respective value stored in each storage register indicates a number of times that the respective buffer region reaches the predetermined usage level within the timing window; and
         re-partitions the buffer memory according to the respective value having a highest value such that a more utilized buffer region is assigned more of the addressable memory registers.

9. A switch network according to claim 8 wherein the logic network assigns a buffer region that is used less often fewer addressable memory registers.

10. A switch network according to claim 8 wherein each buffer region is always assigned at least a minimum number of addressable memory registers.

11. A switch network according to claim 8 wherein the predetermined usage level is full.

12. A switch network according to claim 8 wherein when a least used buffer region is assigned a minimum number of addressable memory registers the logic network assigns a buffer region that is less often fully utilized but that has more than the minimum number of addressable memory registers.

13. A switch network according to claim 8 wherein the data classes represent virtual lanes.

14. A switch network according to claim 8 wherein the timing signal initiates clearing of the plurality of storage registers.

15. A switch network according to claim 8 wherein the card adaptor is a host channel adaptor.

16. A switch network according to claim 15 wherein the host channel adaptor is an InfiniBand host channel adaptor.

17. A switch network according to claim 8 wherein the card adaptor is a target channel adaptor.

18. A switch network according to claim 17 wherein the host channel adaptor is an InfiniBand host channel adaptor.

19. A switch network according to claim 8 further including a central processing unit for sending data to and receiving data from the memory device.

* * * * *